United States Patent
Zilliox et al.

(10) Patent No.: US 7,326,265 B2
(45) Date of Patent: Feb. 5, 2008

(54) METHOD FOR CLEANING THE UPSTREAM SURFACE OF A PARTICULATE FILTER

(75) Inventors: Jean-Philippe Zilliox, Eloie (FR); Bertrand Figueras, Mulhouse (FR)

(73) Assignee: Faurecia Systemes d'Echappement, Nanterre (FR)

( * ) Notice: Subject to any disclaimer, the term of this patent is extended or adjusted under 35 U.S.C. 154(b) by 0 days.

(21) Appl. No.: 10/415,411

(22) PCT Filed: Oct. 12, 2001

(86) PCT No.: PCT/FR01/03177

§ 371 (c)(1), (2), (4) Date: Oct. 16, 2003

(87) PCT Pub. No.: WO02/36943

PCT Pub. Date: May 10, 2002

(65) Prior Publication Data
US 2004/0045439 A1    Mar. 11, 2004

(30) Foreign Application Priority Data

Oct. 31, 2000 (FR) .................................. 00 14023
Mar. 8, 2001 (FR) .................................. 01 03179

(51) Int. Cl.
*B01D 53/34* (2006.01)

(52) U.S. Cl. .......................... 55/302; 55/287; 55/385.3; 55/431; 55/466; 55/482.1; 55/DIG. 10; 55/DIG. 30; 60/296; 60/311; 422/178; 422/179; 422/180; 422/181; 422/211; 422/222; 422/223

(58) Field of Classification Search .................. 55/302, 55/287, 385.3, 431, 466, 482.1, DIG. 10, 55/DIG. 30, 387; 60/296, 311; 210/332, 210/393, 333.01, 333.1, 409, 411, 427; 95/281; 96/233, 228; 422/178–181, 222, 223

See application file for complete search history.

(56) References Cited

U.S. PATENT DOCUMENTS 4,875,335 A * 10/1989 Arai et al. .................... 60/274

(Continued)

FOREIGN PATENT DOCUMENTS

DE        41 34 949 C2 *    4/1993    .................. 55/302

(Continued)

OTHER PUBLICATIONS

Webster's Ninth Collegiate Dictionary, p. 475, definition "fluid" highlighted in yellow.*
Patent Abstracts of Japan, European Patent Office, 02099112, Apr. 11, 1990, Method for Regenerating Filter for Use in Exhaust Gas of Diesel Engine.

*Primary Examiner*—Duane Smith
*Assistant Examiner*—Minh-Chau T. Pham
(74) *Attorney, Agent, or Firm*—Young & Thompson

(57) ABSTRACT

The invention concerns a method for cleaning the upstream surface (14) of a particulate filter (10) of a heat engine exhaust line, the filter (20) being arranged in a casing (12) having an outlet (22) for exhaust gases. The method comprises a step which consists in circulating a liquid flux through the particulate filter (10) from its downstream surface (18) towards its upstream surface (14) viewed from the direction of exhaust gas flow in the filter. The liquid flux circulated through the particulate filter (10) has a flow rate higher than 50 litres/minute and is distributed over the main part of the downstream surface (18) of the particulate filter.

15 Claims, 3 Drawing Sheets

U.S. PATENT DOCUMENTS

| | | | |
|---|---|---|---|
| 5,065,574 A * | 11/1991 | Bailey | 60/274 |
| 5,698,012 A * | 12/1997 | Yoshikawa | 96/47 |
| 5,853,438 A * | 12/1998 | Igarashi | 55/302 |
| 6,103,132 A * | 8/2000 | Seyfried et al. | 210/791 |
| 6,632,406 B1 * | 10/2003 | Michelin et al. | 422/178 |
| 6,755,016 B2 * | 6/2004 | Dittler et al. | 60/297 |
| 6,835,224 B2 * | 12/2004 | Cheng | 55/428 |
| 6,926,760 B2 * | 8/2005 | Miebach | 95/279 |
| 2004/0045439 A1 * | 3/2004 | Zilliox et al. | 95/281 |
| 2004/0103788 A1 * | 6/2004 | Streichsbier et al. | 95/279 |
| 2005/0011357 A1 * | 1/2005 | Crawley | 95/281 |

FOREIGN PATENT DOCUMENTS

| | | | |
|---|---|---|---|
| DE | 43 13 132 A1 | 10/1994 | |
| DE | 197 13 930 A1 | 10/1998 | |
| DE | 199 59 955 A1 * | 6/2000 | 55/302 |
| EP | 0 019 635 | 12/1980 | |
| EP | 0 308 972 | 3/1989 | |
| EP | 0 930 422 A1 | 7/1999 | |
| EP | 1 060 780 A1 | 12/2000 | |

* cited by examiner

METHOD FOR CLEANING THE UPSTREAM SURFACE OF A PARTICULATE FILTER

FIELD OF THE INVENTION

The present invention relates to a method of cleaning the upstream face of a particle filter of an engine exhaust pipe line, the filter being disposed in a casing having an outlet for the exhaust gases, the method comprising a step in which a cleaning stream is caused to flow back through the particle filter from its downstream face towards its face that is upstream relative to the direction in which the exhaust gases flow through the filter.

BACKGROUD OF THE INVENTION

Currently, in motor vehicles having combustion engines, and in particular in vehicles having diesel engines, it is known that a particle filter can be provided in the exhaust pipe line.

Such a particle filter is received inside a metal casing having an inlet for feeding in the exhaust gases and an outlet for removing the exhaust gases.

The particle filter is formed on a filter substrate such as silicon carbonate. In the substrate, a succession of adjacent parallel channels are defined, the channels being closed off at alternate ones of their ends. The gases thus flow through the side walls between adjacent channels.

While the engine is operating, the particle filter retains soot particles on its surface that is upstream relative to the direction in which the exhaust gases flow in the exhaust pipe line.

The soot particles gradually build up on the upstream face, thereby clogging the filter. In order to unclog the filter and in order to guarantee optimum engine operation, it is known that the filter can be regenerated at regular intervals. To this end, the soot on the upstream face of the particle filter is burnt off. In order to facilitate combustion of the soot on the particle filter, it is known that metal additives can be added to the fuel with which the engine is fed, thereby enabling the combustion temperature of the soot to be lowered.

After the particle filter has been regenerated on successive occasions, a non-combustible residue builds up on the upstream face of the particle filter. Such non-combustible residue is made up mainly of oxides, of sulfates, and of phosphates of cerium, of zinc, and of calcium.

In order to conserve the performance of the engine, and to restore the filtering capacity of the particle filter, it is necessary, periodically, to clean the particle filter mechanically.

To that end, it is known that the particle filter and its casing can be dismounted in order to clean the filter.

In one known method, a nozzle delivering a narrow jet of water (having a section of a few millimeters (mm)) is inserted into the casing facing the surface of the particle filter which is downstream relative to the direction in which the gases flow. Under control from automatic displacement means, the nozzle is displaced perpendicularly to the downstream end surface of the particle filter, over a rosette pattern path in order to cover the entire surface of the filter.

That method requires the nozzle to be displaced over the entire surface of the filter. Such displacement can be difficult or impossible when the casing of the particle filter has a converging segment at its output that has a profile that is made irregular because of the compactness constraints with which the casing must comply in order to be installed on the vehicle. In addition, the time required for cleaning the filter is very long because the nozzle must travel over the entire downstream surface of the particle filter.

OBJECT OF THE INVENTION

An object of the invention is to provide a method and a facility for cleaning a particle filter that does not suffer from the above-mentioned drawbacks and that, in particular, enables the filter to be cleaned quickly and effectively.

SUMMARY OF THE INVENTION

To this end, the invention provides a method of cleaning the upstream face of a particle filter of an engine exhaust pipe line, in which method the cleaning stream that is caused to flow back through the particle filter has a flow rate greater than 50 liters per minute (l/min), and is distributed over substantially all of the downstream surface of the particle filter.

In particular implementations of the method, said method has one or more of the following characteristics:

the stream of liquid caused to flow through the particle filter has a flow rate lying in the range 200 l/min to 600 l/min;

the pressure of the liquid upstream from the downstream surface of the particle filter lies in the range 5 bars to 50 bars, and preferably in the range 15 bars to 25 bars;

the liquid has a temperature lying in the range 30° C. to 70° C.;

the liquid is water;

prior to said step in which a stream of liquid is caused to flow through the particle filter, said method further comprises a step in which the particle filter is immersed in a bath subjected to ultrasound vibration;

after the step in which a stream of liquid is caused to flow through the particle filter, the method further comprises a step in which a stream of gas is caused to flow through the particle filter, from its downstream surface towards its upstream surface;

during the step in which a stream of gas is caused to flow through the particle filter, the stream of gas is distributed over substantially all of the downstream surface of the particle filter;

during the step in which a stream of gas is caused to flow through the particle filter, the stream of gas has a flow rate greater than 3000 l/min, and a static pressure greater than 2 bars;

said method comprises a succession of alternating steps in which a stream of liquid is caused to flow through the particle filter and in which a stream of gas is caused to flow through the particle filter, from its downstream surface to its upstream surface;

the stream of liquid is fed into said casing via a duct connected to the outlet via which the exhaust gases exit from the casing, and the cross-section of the duct is substantially equal to the cross-section of the exhaust gas outlet of the casing; and during a portion of said step in which a stream of liquid is caused to flow through the particle filter, closure means are applied to on a small portion of the upstream face of the particle filter.

The invention also provides a facility for cleaning the upstream face of a particle filter of an engine exhaust pipe line, said facility being characterized in that it comprises flow-generating means for causing a stream of liquid having a flow rate greater than 50 l/min to flow through the particle filter, and in that said flow-generating means are adapted to distribute the stream of liquid over substantially all of the downstream surface of the particle filter.

BRIEF DESCRIPTION OF THE DRAWINGS

The invention will be better understood on reading the following description given merely by way of non-limiting example and with reference to the accompanying drawings, in which.

DETAILED DESCRIPTION OF THE INVENTION

Figure 1:
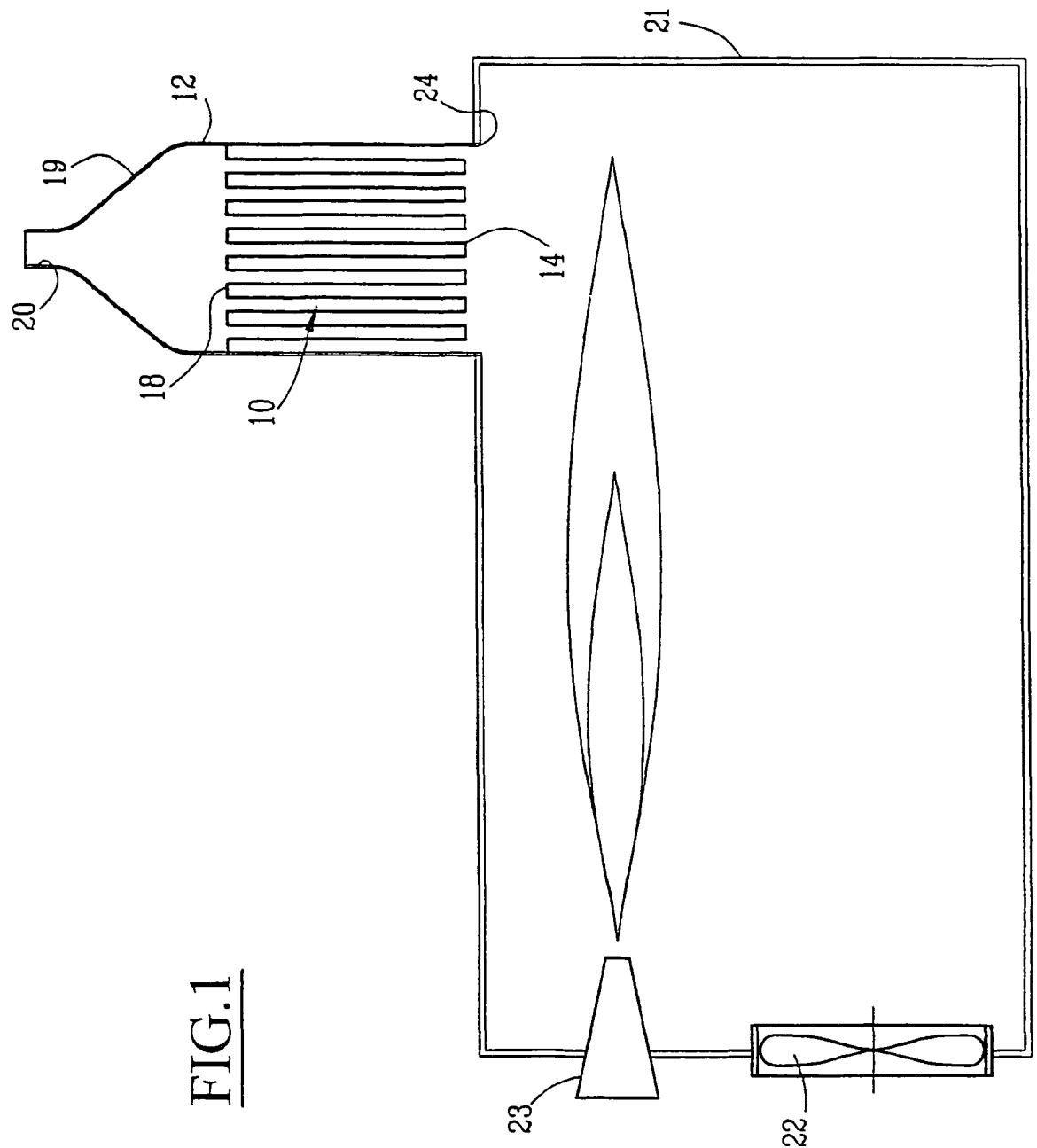
FIG. 1 is a diagrammatic view of equipment for regenerating the soot on the upstream face of a particle filter shown in section.

The figures show a motor vehicle particle filter 10 disposed inside a metal casing 12. The filter 10 and its casing 12 have been dismounted from the exhaust pipe line in which they are normally installed.

The particle filter 10 is constituted by a porous substrate in which adjacent parallel channels are defined that are closed off at alternate ends.

For example, the length of the particle filter 10 is 254 mm and its diameter is 144 mm. Its volume is 4.1 l for a mass of 3300 grams (g).

With such a filter, when it is clean, the back pressure measured for a flow speed equal to 12.7 meters per second (m/s) is 10 kilo pascals (kPa).

The numerical values given in the description below correspond to such a filter.

They are applicable for filters having characteristics adapted to treat an exhaust gas flow rate in the range 25 kilograms per hour (kg/h) to 700 kg/h.

The particle filter 10 has a face 14 that is upstream relative to the normal direction of flow of gas in the exhaust pipe line. The term "upstream face" 14 designates the upstream end surface of the filter and the surfaces of the channels that open out in said surface. The upstream face 14 of the particle filter is accessible through an open end 16 in the casing 12. The open end 16 has a cross-section substantially identical to the cross-section of the particle filter 14. When the particle filter is mounted on an exhaust pipe line, the casing 12 is extended upstream from its end 16 by the casing of a catalytic converter.

After prolonged use of the vehicle, the upstream face 14 of the particle filter is loaded with non-combustible residue which must be removed from the filter during the cleaning operation. Furthermore, soot not burnt during a prior regeneration stage can also be present on the upstream face of the filter.

The mass of ash, i.e. of non-combustible residue, on the upstream face of the filter prior to cleaning is at least 100 g.

The filter 10 has a downstream face 18 opposite from its upstream face 14, where "upstream" and "downstream" are terms relative to the normal flow direction of the exhaust gases in the exhaust pipe line.

Facing the downstream face 18 of the particle filter, the casing 12 has a segment 19 converging from the downstream face 18 of the particle filter to an outlet 20 normally serving to remove the exhaust gases coming from the particle filter.

The outlet 20 has a cross-section corresponding substantially to the cross-section of the pipes making up the exhaust pipe line.

Before commencing the cleaning proper of the filter, consisting in removing the non-combustible residue, the soot not burnt during a prior regeneration stage must be removed from the upstream surface 14 of the filter after said filter has been dismounted.

For this purpose, the regeneration equipment shown in FIG. 1 is used.

The regeneration equipment comprises a tank 21 having an air intake equipped with a fan 22. In addition, a burner 23 is disposed on one wall of the tank 21 in order to generate a flame inside the tank.

In the vicinity of the flame formed by the burner 23, an opening 24 is provided in the tank 21. The opening is adapted to enable the casing 12 of the particle filter to be connected to it via its open end 16. Thus, the upstream face 14 of the particle filter is exposed facing the inside of the tank 21.

For the purpose of regenerating the soot on the upstream face 14 of the particle filter, the air taken from the outside by the fan 22 is fed into the tank and is caused to flow through the particle filter after having been heated in contact with the flame generated by the burner 23. Thus, a stream of hot air is established through the filter from its upstream face 14 towards its downstream face 18. The stream of hot air is removed via the outlet 20 of the filter.

The fan 22 is adapted for an air flow rate of about 250 kg/h at a pressure lying in the range 1 bar to 2 bars. The burner 23 is dimensioned so that the temperature of the gases on the upstream face of the particle filter lies in the range 550° C. to 650° C., and, in particular, less than 600° C.

The stream of hot air through the particle filter is sustained for a lapse of time lying in the range 2 minutes to 20 minutes, and preferably 5 minutes to 10 minutes.

The flow of hot air through the filter increases the temperature of the soot present on the upstream face, causing said soot to burn.

After full combustion of the soot, the casing 12 containing the particle filter 10 is dismounted from the tank 21.

Figure 2:
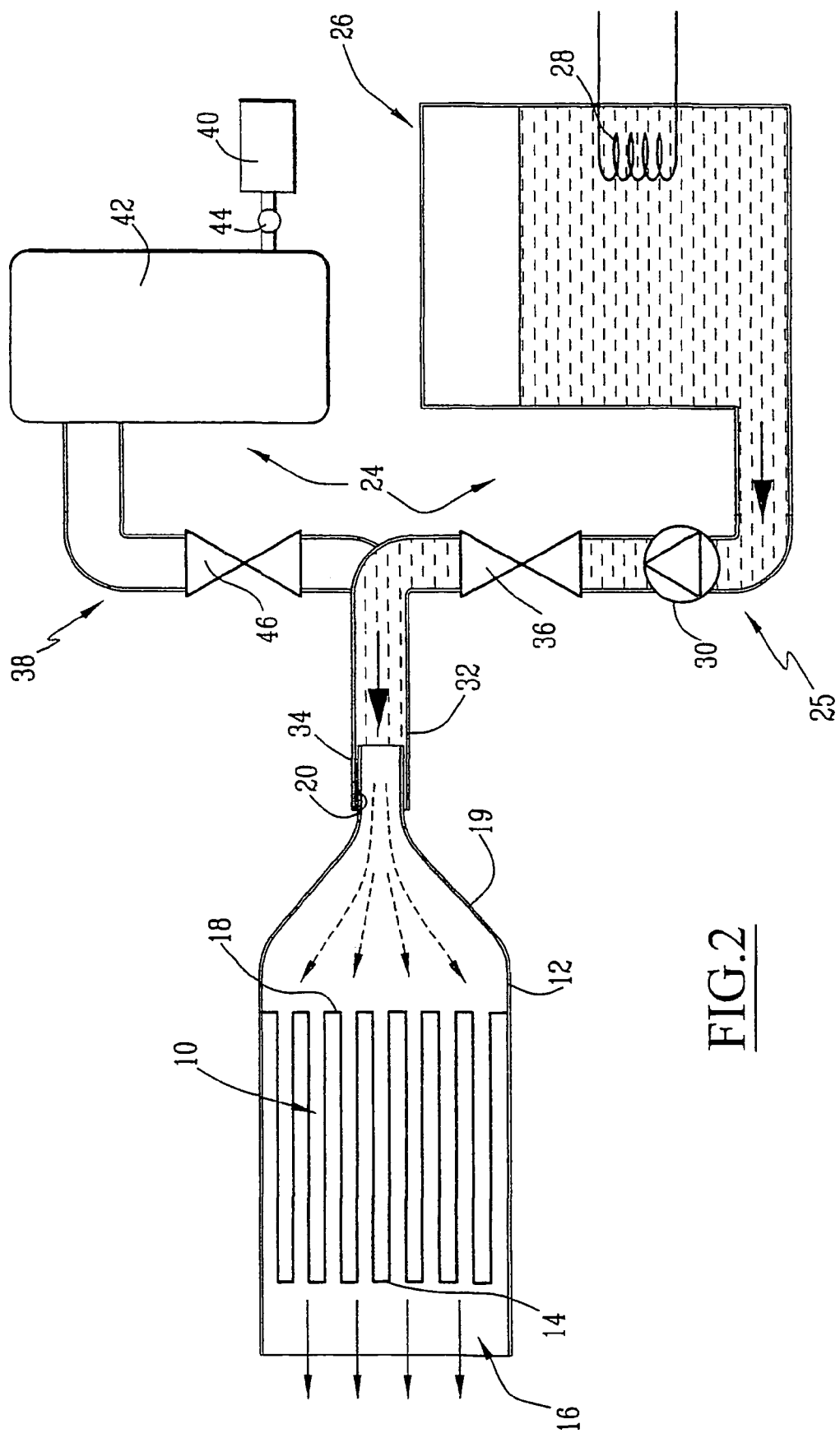
FIG. 2 is a diagrammatic view of a facility for cleaning the upstream face of a particle filter shown in section, during a first cleaning stage.

The unburnt residue deposited on the upstream face of the particle filter 10 is then removed in the facility shown in FIG. 2.

The facility for cleaning the particle filter 10 includes cleaning fluid feed means 25. Said feed means comprise a reservoir 26 constituted, for example, by a tank containing water. Water heating means 28 of any suitable type are installed in the tank 26. The outlet of the tank 26 is connected to a pump 30 advantageously constituted by a reciprocating pump. The outlet of the pump is connected to a duct 32 adapted to convey the stream of cleaning liquid from the reservoir 26 to the outlet of the particle filter. At its end, the duct 32 has a coupling 34 making it possible to connect the duct directly and in leaktight manner to the outlet 20 of the particle filter.

The duct 32 and its coupling 34 are of cross-section substantially identical to the cross-section of the outlet 20.

In addition, a stop valve 36 is provided at the outlet of the pump 30.

Air feed means 38 for feeding in air under pressure are also connected to the duct 32, downstream from the valve 36.

Said means 38 comprise an air compressor 40 whose outlet is connected to a variable-pressure air tank 42, the pressure of the air in the tank lying in the range 2 bars to 6 bars.

A pressure regulator 44 is interposed between the outlet of the compressor and the inlet of the tank 42.

The outlet of the tank 42 is connected to the duct 32 via a stop valve 46.

The valves 36 and 46 are connected to control means so as to connect the duct 32 alternately to the water feed means 25 or to the air feed means 38.

After the regeneration stage performed in the equipment shown in FIG. 1, the outlet 20 of the filter is connected to the duct 32, as shown in FIG. 2. A stream of cleaning liquid (advantageously water) is then caused to flow through the particle filter 10 from its downstream surface 18 towards its upstream surface 14.

The stream of liquid is caused to flow through the filter at a flow rate greater than 50 l/min, the pump 30 being adapted for such a flow rate. Advantageously, said flow rate lies in the range 200 l/min to 600 l/min. It is preferably substantially equal to 300 l/min.

The stream of liquid is distributed over substantially all of the downstream surface 18 of the particle filter, the volume between the downstream face 18 and the outlet 20 of the filter being entirely filled with liquid.

When the stream of liquid is caused to flow, the pressure of the liquid, upstream from the downstream surface 18 of the particle filter advantageously lies in the range 5 bars to 50 bars. Said pressure is preferably equal to 20 bars. The pump 20 is adapted to impose such a pressure.

The liquid used for sweeping through the particle filter is water, advantageously heated to a temperature lying in the range 30° C. to 70° C. Preferably, said temperature is substantially equal to 50° C.

In the embodiment shown, the water comes from the reservoir 26 equipped with heater means 28. However, the water may come from a running water supply network, and in particular from a mixer for mixing hot and cold water coming from two distinct water supply networks for supplying water at different temperatures.

A first step in causing the cleaning liquid to flow is performed while the upstream face 14 of the particle filter is left free. This first step lasts for 20 seconds, for example. During this step, the stream of liquid is maintained continuously with a flow rate and a pressure as indicated above.

Advantageously, during this step, the flow of cleaning liquid is interrupted by means of the valve 36 shown in FIG. 2. The valve 46 is then opened. From the air feed means 38, a stream of air is established through the particle filter 10 from its downstream face 18 towards its upstream face 14. This second step lasts for 5 seconds, for example.

The blower means 60 are adapted to deliver a stream of air having a flow rate lying in the range 50 l/s to 300 l/s and preferably substantially equal to 150 l/s. The pressure upstream from the downstream surface 18 of the particle filter lies in the range 2 bars to 10 bars, and is advantageously substantially equal to 5 bars.

A succession of steps in which the filter is swept through with water and with air is then implemented. One water sweeping step and one air sweeping step form one cleaning cycle.

One cycle of the cleaning method of the invention advantageously lasts in the range 30 seconds to 50 seconds, and preferably 40 seconds.

Advantageously, for cleaning any one filter, a cleaning cycle is repeated in the range once to 10 times, and preferably about 5 times.

Figure 3:
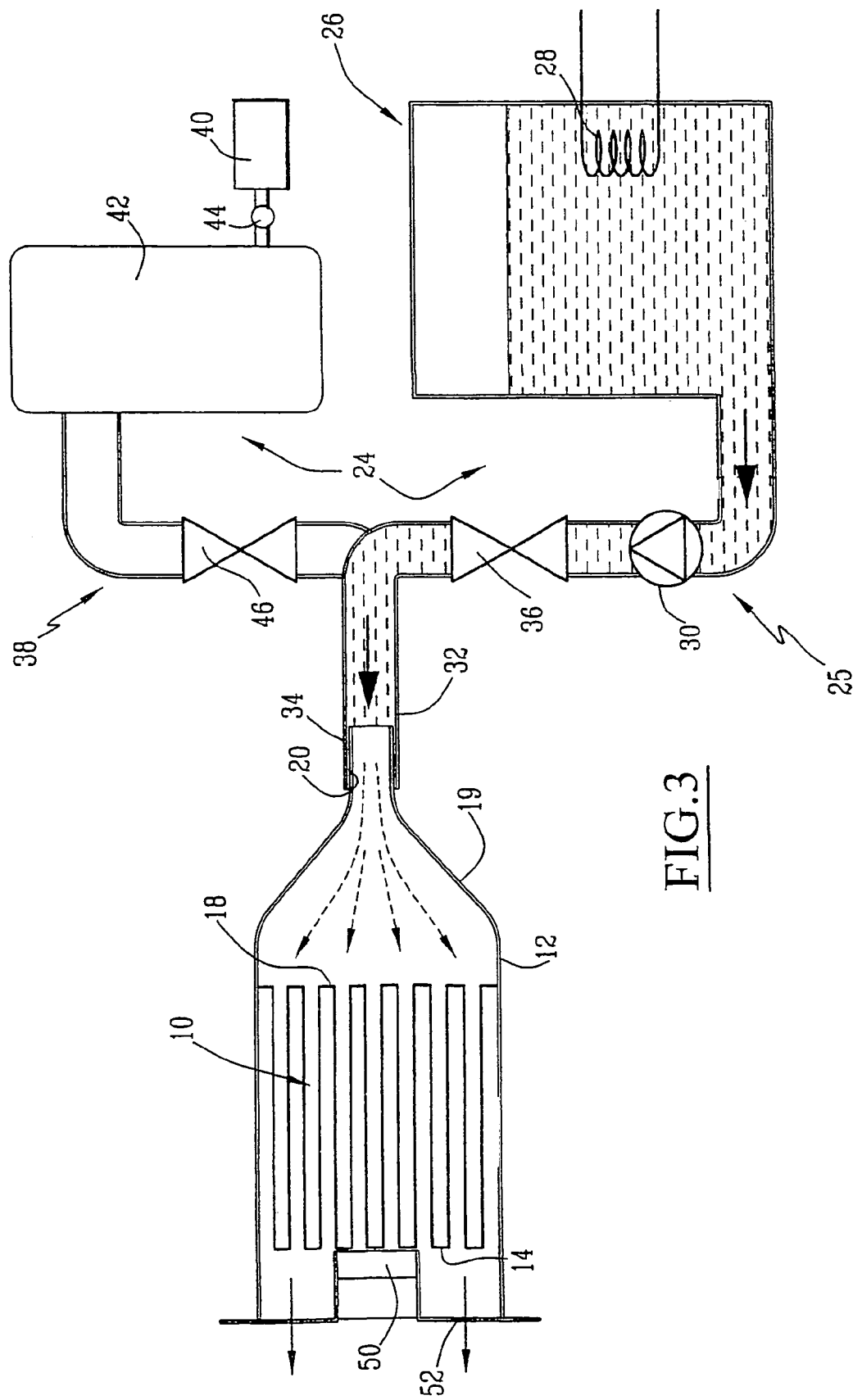
FIG. 3 is a view identical to FIG. 1 during a second cleaning stage.

Advantageously, an additional cleaning step such as the step shown in FIG. 3 is implemented. During this step, the streams of liquid or of gas are sustained under same conditions as above. However, closure means 50, e.g. constituted by a flat disk, are applied against a portion of the upstream surface 14 of the particle filter. The closure means 50 are carried, for example, by a cross-piece 52 allowing the streams to flow past on either side of the closure means.

Advantageously, the closure means 50 are placed only in alignment with the outlet 20 through which the cleaning flows are fed in. In particular, the closure means are advantageously mounted in the central portion of the upstream surface 14 of the particle filter.

This additional step lasts 20 seconds, for example.

After the various cleaning steps, the particle filter is mounted back on the vehicle.

It can be understood that water and optionally air flowing at high flow-rates and pressures through the particle filter causes the non-combustible residue deposited on the upstream surface 14 of the particle filter to be detached and removed. In particular, such detaching takes place preferentially in alignment with the outlet 20 via which the cleaning liquid is fed in.

During the additional step shown in FIG. 3, the presence of the closure means 50 causes the liquid to flow preferentially at the periphery of the central region of the filter aligned with the outlet 20. Thus, the regions of the upstream surface 14 of the particle filter that are not covered by the closure means 50 are then rid of the non-combustible residue, since substantially all of the stream of liquid then passes through these regions of the upstream surface.

This additional step is preferably implemented. However, it may be omitted.

It is observed that, during the various stages, the high flow-rate of liquid established through the particle filter, associated with a high pressure of said liquid, guarantees that the residue is detached and removed satisfactorily. In addition, the higher-than-ambient temperature of the liquid facilitates the detaching.

In addition, advantageously, before causing the cleaning liquid to flow through the particle filter, said particle filter is, after it has been dismounted, immersed with its casing 12 in a bath subjected to ultrasound vibration.

The invention claimed is:

1. A method of cleaning the upstream face of a particle filter of an engine exhaust pipe line, the filter being disposed in a casing having an outlet for the exhaust gases, the method comprising a step in which a cleaning stream of liquid is caused to flow back through the particle filter from its downstream face towards its face that is upstream relative to the direction in which the exhaust gases flow through the filter, wherein the cleaning stream of liquid that is caused to flow back through the particle filter is distributed over all of the downstream surface of the particle filter, and wherein the volume between said downstream surface and said outlet is entirely filled with liquid.

2. A method according to claim 1, wherein the cleaning stream is a stream of liquid whose flow rate is greater than 50 l/min.

3. A method according to claim 2, wherein the stream of liquid caused to flow through the particle filter has a flow rate lying in the range 200 l/min. to 600 l/min.

4. A method according to claim 2, wherein the pressure of the liquid upstream from the downstream surface of the particle filter lies in the range 5 bars to 50 bars, and preferably in the range 15 bars to 25 bars.

5. A method according to claim 1, wherein the liquid has a temperature lying in the range 30° C. to 70° C.

6. A method according to claim 2, wherein the liquid is water.

7. A method according to claim 1, further comprising, prior to said step in which a cleaning stream is caused to flow through the particle filter, a step in which the particle filter is immersed in a bath subjected to ultrasound vibration.

8. A method according to claim 2, further comprising, after the step in which a stream of liquid is caused to flow through the particle filter, a step in which a stream of gas is caused to flow through the particle filter, from its downstream surface towards its upstream surface.

9. A method according to claim 8, wherein, during the step in which a stream of gas is caused to flow through the particle filter, the stream of gas is distributed over substantially all of the downstream surface of the particle filter.

10. A method according to claim 8, wherein, during the step in which a stream of gas is caused to flow through the particle filter, the stream of gas has a flow rate greater than 3000 l/min, and a static pressure greater than 2 bars.

11. A method according to claim 8, comprising a succession of alternating steps in which a stream of liquid is caused to flow through the particle filter and in which a stream of gas is caused to flow through the particle filter, from its downstream surface to its upstream surface.

12. A method according to claim 1, wherein the cleaning flow is fed into said casing via a duct connected to the outlet via which the exhaust gases exit from the casing, and wherein the cross-section of the duct is substantially equal to the cross-section of the exhaust gas outlet of the casing.

13. A method according to claim 1, wherein, during a portion of said step in which a cleaning stream is caused to flow through the particle filter, closure means are applied to a small portion of the upstream face of the particle filter.

14. A method according to claim 1, wherein the particle filter has a plurality of parallel passages therethrough, and wherein said stream of liquid is introduced into the particle filter in a direction parallel to said passages.

15. A method according to claim 14, wherein said stream of liquid is introduced along a line which is directed centrally of said passages.

* * * * *